(12) United States Patent
Bekerian et al.

(10) Patent No.: US 7,917,449 B2
(45) Date of Patent: Mar. 29, 2011

(54) METHOD AND SYSTEM CAREER MANAGEMENT ASSESSMENT MATCHING

(75) Inventors: Debra A. Bekerian, Fresno, CA (US);
James J. Lanas, Fresno, CA (US)

(73) Assignee: Career Matching Services, Inc., Fresno, CA (US)

( * ) Notice: Subject to any disclaimer, the term of this patent is extended or adjusted under 35 U.S.C. 154(b) by 631 days.

(21) Appl. No.: 11/906,470

(22) Filed: Oct. 2, 2007

(65) Prior Publication Data

US 2008/0082384 A1    Apr. 3, 2008

Related U.S. Application Data

(60) Provisional application No. 60/848,933, filed on Oct. 3, 2006.

(51) Int. Cl.
*G06Q 10/00* (2006.01)
(52) U.S. Cl. ........................ 705/321; 705/1.1
(58) Field of Classification Search ............... 705/321
See application file for complete search history.

(56) References Cited

U.S. PATENT DOCUMENTS

| 2004/0186743 | A1 | 9/2004 | Cordero |
| 2004/0219493 | A1 | 11/2004 | Phillips |
| 2005/0080657 | A1 | 4/2005 | Crow |
| 2006/0053046 | A1 | 3/2006 | Bonnstetter |
| 2006/0105306 | A1 | 5/2006 | Sisney |
| 2008/0133717 | A1 | 6/2008 | Rao |

OTHER PUBLICATIONS

Partial PCT Search Report No. PCT/US2007/021,162.

*Primary Examiner* — Jonathan Ouellette
(74) *Attorney, Agent, or Firm* — Lesavich High-Tech Law Group, P.C.; Stephen Lesavich

(57) ABSTRACT

A method for system for career matching assessment matching. One or more electronic questionnaires that are designed to reflect models of working environments, problem solving, communication and inter-personal skills are presented via a communications network. Each candidate and/or employer fills in a separate questionnaire. The particular pattern of their answers provides a profile for both the job seeker and the employer. A matching process then assesses the amount of overlap between the profiles of different candidates and employers. Greater candidate-employer overlap yields superior job performance, higher levels of job satisfaction and longer retention.

22 Claims, 3 Drawing Sheets

METHOD AND SYSTEM CAREER MANAGEMENT ASSESSMENT MATCHING

CROSS REFERENCES TO RELATED APPLICATIONS

This application claims priority for U.S. Provisional Application 60/848,933, filed Oct. 3, 2006, the contents of which are incorporated by reference.

FIELD OF THE INVENTION

This invention relates to career matching. More specifically, it relates to a method and system for career management assessment matching.

BACKGROUND OF THE INVENTION

The Internet and other communications networks are being used by employment recruiting companies. Trends have emerged in the strategy and tactics that Internet-based employment recruiting companies are deploying to compete with a plethora of both large and small competitors, including employers directly. These trends are driven by the predictable specialization that occurs in any industry as it begins to mature.

Internet marketing strategy is becoming more local in its market targeting in two ways. First, it is becoming more industry specific, and, second, it is becoming more specific to local geographic markets. In every large city, traditional newspaper advertising is in broad decline, particularly with respect to the employment want ads section. It is rapidly becoming all about vertical markets in local communities. This two focus is rapidly becoming determinants in the definition of market share. Witness the success of www.nwjobs.com in the Pacific Northwest, or the increasingly local emphasis of www.monster.com. Because of these realizations, large recruiting competitors are now beginning to buy up niche and boutique firms, a clear indication of consolidation.

The recruiting industry is also evolving technologically, as do all. Coming very soon is highly specialized and very covert search engines that will silently crawl every crevice and website on the Internet looking for job seekers that the recruiting companies can exploit. These engines will report all of the data (resumes, etc.) they find 24/7 to their commanders. Employers will soon learn to appreciate the time and cost-saving value of such tools, and these tools will develop into products that job seekers can buy and use in reverse to find employers.

This new technology will also create a secondary issue and opportunity with the enormous amounts of employment data that will need to be sorted, categorized, rated, and otherwise made useful. Efficient management of this employment data will differentiate between those who use the technology successfully and those who fail. The opportunity to create a methodology to manage this data is momentary.

A very similar need exists for employers directly. For example, int the third week of June 2006, one of the three major television networks featured a nightly news presentation of a San Francisco restaurant owner who needed to hire a new cashier. This owner advertised in two locations, a want ad in one of the two local newspapers and an Internet posting on the locally based www.craigslist.com. From the first, the owner got 4 responses. From the second, the owner got over 400 responses. How will this busy owner find the time to sort the best responses from the second marketing approach?

Another example is even more useful, and all of us have seen it on television. One Internet-based dating company created the concept of a computer-managed profile-matching service based on questionnaires. The greater the statistical match, the more likely the compatibility, and the more likely the long term relationship. This insight revolutionized the Internet dating industry, and a very similar opportunity exists within the Internet-based employment recruiting industry.

There have been attempts in other industries to match people based on entered profiles. See, for example: 1. www.self-directed-search.com/aboutsds.html. 2. www.eHarmony.com 3. www.match.com, etc.

Thus, it is desirable to provide overcome these and other problems associated with career management assessment matching.

SUMMARY OF THE INVENTION

In accordance with preferred embodiments of the present invention, some of the problems associated matching candidates to job openings are overcome. A method and system for career management assessment and matching is presented.

One or more electronic questionnaires that are designed to reflect models of working environments, problem solving, communication and inter-personal skills are presented via a communications network. Each candidate and/or employer fills in a separate questionnaire. The particular pattern of their answers provides a profile for both the job seeker and the employer. A matching process then assesses the amount of overlap between the profiles of different candidates and employers. Greater candidate-employer overlap yields superior job performance, higher levels of job satisfaction and longer retention.

The foregoing and other features and advantages of preferred embodiments of the present invention are more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF THE INVENTION

Figure 1:
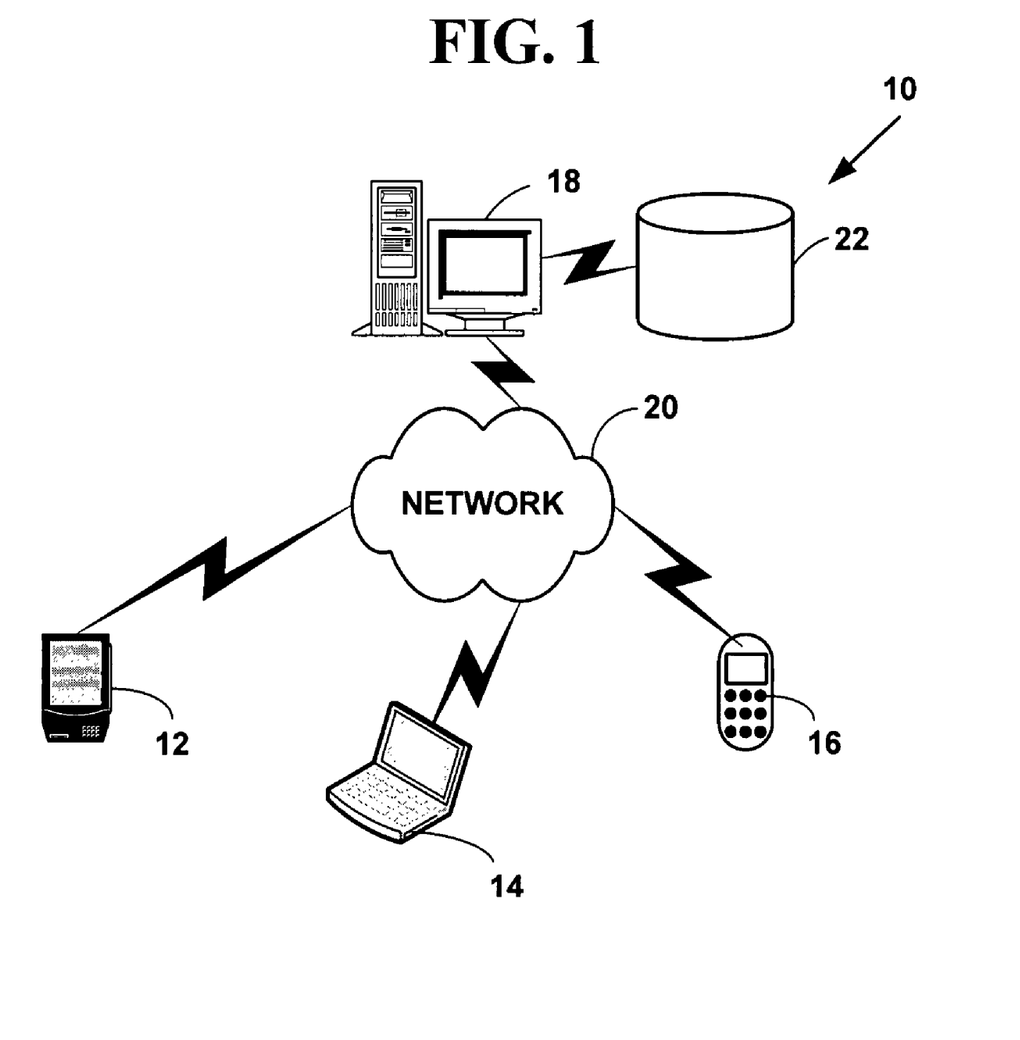
FIG. 1 is a block diagram illustrating an exemplary career matching assessment system.

FIG. 1 is a block diagram illustrating an exemplary career matching assessment system 10. The system 10 includes, but is not limited to, plural network devices 12, 14, 16 (three of which are illustrated). The plural network devices 12, 14, 16 include but are not limited to desktop computers, laptop computers, personal digital/data assistants (PDAs), mobile phones, non-mobile phones, interactive TV systems through set top boxes for cable television (CATV), satellite television or other television networks, Internet appliances and other types of network devices.

The plural network devices 12, 14, 16 communicate with a one or more information servers network device 18 (one of which is illustrated) using one or more wired or wireless communications protocols over a communications network 20. The one or more information server network devices 18 include one or more servers hosting a web-site. The one or more information server network devices 18 may also include file servers or other types of servers.

The communications network 20 includes, but is not limited to, the Internet, an intranet, a wired Local Area Network (LAN), a wireless LAN (WiLAN), a Wide Area Network (WAN), a Metropolitan Area Network (MAN), Public Switched Telephone Network (PSTN) and other types of communications networks 20 providing voice, video and data communications.

The communications network 20 may include one or more gateways, routers, or bridges. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another.

The communications network 20 may also include one or more additional servers or access points (AP) including wired and wireless access points (WAP) (not illustrated). The one or more servers include web-site servers, file servers and other types of servers.

The one or more information server network devices 18 include one or more associated databases 22 (one of which is illustrated). The one or more associated databases 22 include plural career matching assessment service forms and other career information such as resumes, etc. in plural digital formats, including, but not limited to, Hyper Text Markup Language (HTML), Extensible Markup Language (XML), flash media, Java and various combinations thereof.

Preferred embodiments of the present invention include network devices that are compliant with all or part of standards proposed by the Institute of Electrical and Electronic Engineers ("IEEE"), International Telecommunications Union-Telecommunication Standardization Sector ("ITU"), European Telecommunications Standards Institute (ETSI), Internet Engineering Task Force ("IETF"), U.S. National Institute of Security Technology ("NIST"), American National Standard Institute ("ANSI"), Wireless Application Protocol ("WAP") Forum, Data Over Cable Service Interface Specification (DOCSIS), Bluetooth Forum, or the ADSL Forum. However, network devices based on other standards could also be used. IEEE standards can be found on the World Wide Web at the Universal Resource Locator ("URL") "www.ieee.org." The ITU, (formerly known as the CCITT) standards can be found at the URL "www.itu.ch." ETSI standards can be found at the URL "www.etsi.org." IETF standards can be found at the URL "www.ietf.org." The NIST standards can be found at the URL "www.nist.gov." The ANSI standards can be found at the URL "www.ansi.org." DOCSIS documents can be found at the URL "www.cablemodem.com." Bluetooth Forum documents can be found at the URL "www.bluetooth.com." WAP Forum documents can be found at the URL "www.wapforum.org." ADSL Forum documents can be found at the URL "www.adsl.com."

The plural network devices 12, 14, 16 include a protocol stack with multiple layers based on the Internet Protocol or Opens Systems Interconnection (OSI) reference model. The protocol stack includes, but is not limited to, Transmission Control Protocol (TCP), User Datagram Protocol (UDP), Internet Protocol (IP), Hypertext Transfer Protocol (HTTP) and other communication protocols.

As is known in the art, the OSI reference model is a layered architecture that standardizes levels of service and types of interaction for computers exchanging information through a communications network. The OSI reference model separates network device-to-network device communications into seven protocol layers, or levels, each building- and relying—upon the standards contained in the levels below it. The OSI reference model includes from lowest-to-highest, a physical, data-link, network, transport, session, presentation and application layer. The lowest of the seven layers deals solely with hardware links; the highest deals with software interactions at the application-program level.

TCP provides a connection-oriented, end-to-end reliable protocol designed to fit into a layered hierarchy of protocols that support multi-network applications. For more information on TCP 58 see RFC-793, incorporated herein by reference.

UDP provides a connectionless mode of communications with datagrams in an interconnected set of networks. For more information on UDP see ITEF RFC-768 incorporated herein by reference.

IP is an addressing protocol designed to route traffic within a network or between networks. For more information on IP 54 see IETF RFC-791 incorporated herein by reference.

HTTP is a standard protocol for communications on the World Wide Web. For more information on HTTP, see IETF RFC-2616 incorporated herein by reference.

An operating environment for the devices used in the digital publishing system 10 include a processing system with one or more high speed Central Processing Unit(s) ("CPU"), one or more processors and one or more memories. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It is appreciated that acts and symbolically represented operations or instructions include the manipulation of electrical signals or biological signals by the CPU or processor. An electrical system or biological system represents data bits which cause a resulting transformation or reduction of the electrical signals or biological signals, and the maintenance of data bits at memory locations in a memory system to thereby reconfigure or otherwise alter the CPU's or processor's operation, as well as other processing of signals. The memory locations where data bits are maintained are physical locations that have particular electrical, magnetic, optical, or organic properties corresponding to the data bits.

Figure 2:
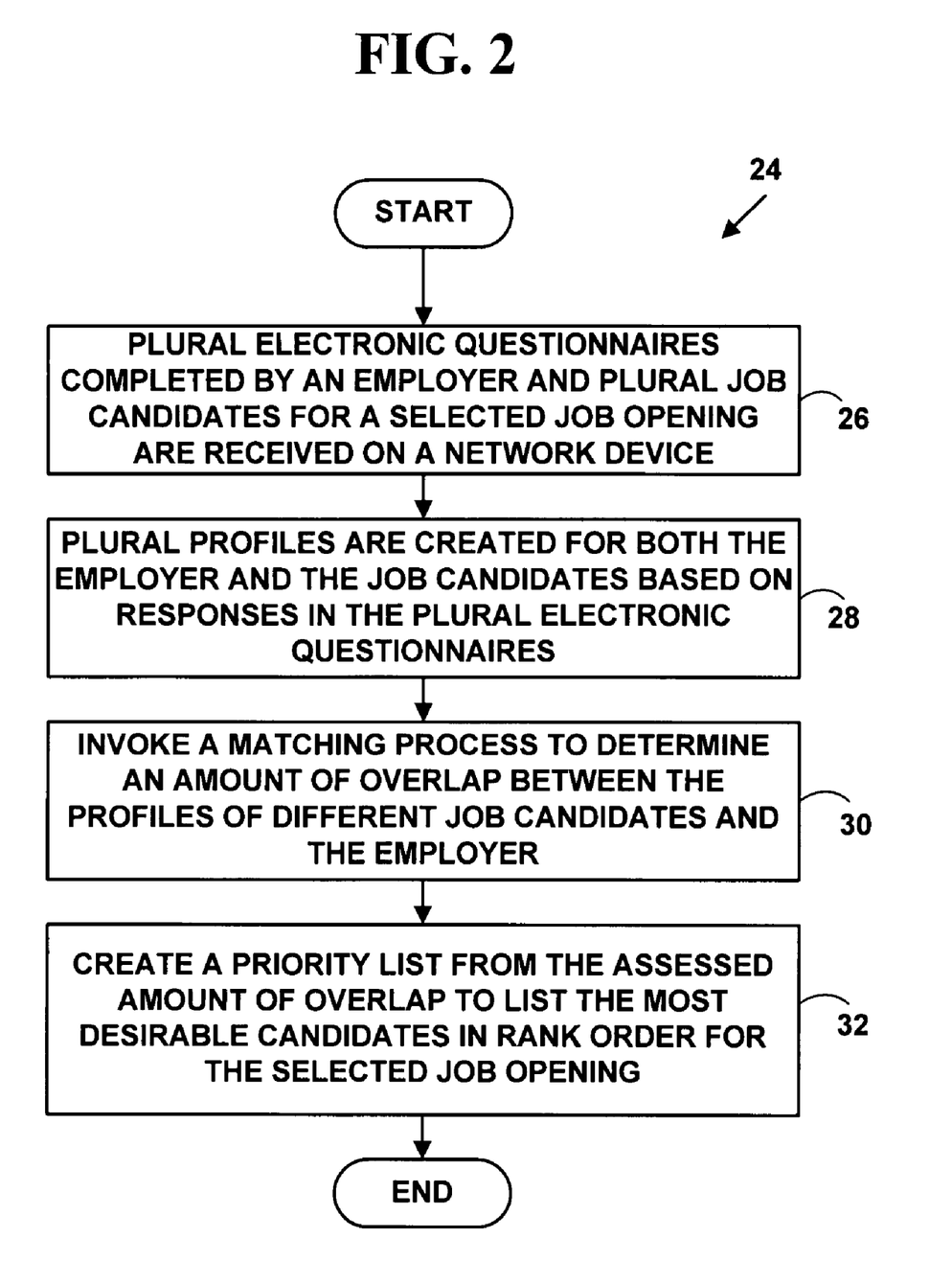
FIG. 2 is a flow diagram illustrating method for career matching assessment.

The data bits may also be maintained on a computer readable medium including magnetic disks, optical disks, organic memory, and any other volatile (e.g., Random Access Memory ("RAM")) or non-volatile (e.g., Read-Only Memory ("ROM"), flash memory, etc.) mass storage system readable by the CPU. The computer readable medium includes cooperating or interconnected computer readable medium, which exist exclusively on the processing system or can be distributed among multiple interconnected processing systems that may be local or remote to the processing system.
Exemplary Methods for Career Management Matching Assessment FIG. 2 is a flow diagram illustrating a Method 24 for career matching assessment. At Step 26, plural electronic questionnaires are received on a network device via a communications network. The plural of electronic questionnaires are designed to measure attributes of models of working environments, problem solving, communication and inter-personal skills related to job performance and job satisfaction for a selected job opening. The plural electronic questionnaires are completed by an employer and plural job seekers. At Step 28, a profile is created for the employer and the plural job seekers based on responses in the plural electronic questionnaires. At Step 30, a matching process is invoked to assess an amount of overlap between the profiles of the plural job seekers and the employer. At Step 32, a priority list is created on the network device from the assessed amount of overlap to list the most desirable job seeker candidates in rank order for the selected job opening.

Method 24 is illustrated with an exemplary embodiment. However, the invention is not limited to this embodiment and other embodiments can also be used to practice the invention.

In such an exemplary embodiment at Step 26, plural electronic questionnaires are received on a network device 18 via a communications network 20. The plural of electronic questionnaires are designed to measure attributes of models of working environments, problem solving, communication and inter-personal skills related to job performance and job satisfaction for a selected job opening. The plural electronic questionnaires are completed by an employer and plural job seekers.

In one embodiment, an employer fills out one or more electronic questionnaires for a selected job being offered to job seekers. In another embodiment, a job seeker fills out one or more electronic questionnaires for a desired job that may or may not exist and may or may not be offered by an employer. In another embodiment, a job seeker fills out one or more electronic questionnaires designed an employer. In another embodiment, an employer fills out one or more electronic questionnaires designed for a job seeker. Other combinations are also possible. Such embodiments allow a number of combinations of assessment and matching.

In one embodiment, the electronic questionnaires are presented to a network device 12, 14, 16 via web-site 22 on the Internet 20, an intranet, a LAN, etc. to both employer network device (e.g., 16) and a plurality of job seekers network devices (e.g., 12, 14). However, the present invention is not limited to such and embodiment and other embodiments can also be used to practice the invention.

In one embodiment the plural electronic questionnaires are provided by a tool called Career Matching Assessment Tool (CMAT). However, the present invention is not limited to such an embodiment and other embodiments can be used to practice the invention.

In one embodiment, the plural electronic questionnaires include a HTML form, an XML form, a Java form, etc. However, the present invention is not limited to the forms described and other embodiments can be used to practice the invention.

The plural electronic questionnaires include a one or more employment questionnaires that asks different types of questions about an employer's beliefs, attitudes and thoughts about the working environment and working relationships. The focus is on the employer's views on the work/life balance, their ideas about working relationships and how they would go about solving dilemmas and problems at work.

In one embodiment, the one or more employer questionnaire includes external and internal dimensions. However, the present invention is not limited to these dimensions and more, fewer and other dimensions can also be used to practice the invention.

1. External dimensions: These include, but are not limited to, salary, location, type of practice, type of professional encounters, employment benefits. These are standard questions that are asked in all selection and matching exercises. However, the present invention is not limited to these dimensions and more, fewer and other dimensions can also be used to practice the invention.

2. Internal dimensions: These include, but are not limited to, mental and perceptual biases, emotional expression, verbal and social expression, personal values and moral codes, physicality (e.g., levels of physical energy and ways of expression), personal resiliency and social skills. Answers to these questions form the basis for the profile created at Step 28. However, the present invention is not limited to these dimensions and more, fewer and other dimensions can also be used to practice the invention.

The plural electronic questionnaires also include one or more job seeker questionnaires with completed by one or more job seekers for the selected job. The one or more job seeker questionnaires ask different types of questions about a job seeker's beliefs, attitudes and thoughts about the working environment and working relationships. The focus is on the job seeker's views on the work/life balance, their ideas about working relationships and how they would go about solving dilemmas and problems at work.

In one embodiment, the one or more job seeker questionnaire includes external and internal dimensions. However, the present invention is not limited to these dimensions and more, fewer and other dimensions can also be sued to practice the invention.

In one embodiment, the one or more job seeker questionnaires include a HTML form, an XML form, a Java form, etc. However, the present invention is not limited to the forms described and other embodiments can be used to practice the invention.

The job seekers and employers answer a series of general multiple choice questions that focus on different aspects of the working environment and working relationships. There are no correct or incorrect answers to the items. The general questions do not assess any underlying personality traits.

At Step 28, plural profiles are created for both the employer and the job seekers based on responses in the employer and job seeker electronic questionnaires. The profile is used to establish how compatible two people are, with respect to their views on the working environment, working relationships, and problem solving.

A separate profile for each job seeker/employer is created on the basis of answers to questions that assess external and internal dimensions. Separate scores for external and internal dimensions, and combined scores is computed, compared and matched. However, the present invention is not limited to these dimensions and more, fewer and other dimensions can also be used to practice the invention.

At Step 30, a matching process assesses an amount of overlap between the profiles of different job seekers and the employer. For example, employers and job seekers/employees are compared to see how well they match each other answers. The employer (e.g., generally the person responsible for establishing the 'culture' of the organization, etc.) and employee/job seeker complete an electronic questionnaire. Their answers are then compared for similarity and matches. The statistical significance of their matches (or mismatch) is then evaluated. No information is given regarding how specific items were answered, or which specific answers were similar.

The matching process is based on at least the following three assumptions. However, the present invention is not limited to these assumptions and more, fewer or other assumptions can also be used.

1. Underlying models influence job expectations and the social "culture" in the workplace: Each job seeker and employer has one or a small number of underlying models of their best working environment: these models help to form the basis for job expectations. Each job seeker and employer also have a model of what constitutes good working relationships: these models help to form the basis for the 'culture' of the organization and directly influence expectations about social interactions and conflict resolution. Such models are based on ideas, beliefs, attitudes, experiences and deep-seated values. They are correlated with specific personality and emotional attributes, temperamental and mental characteristics. They can also be correlated with different behavioral responses, for example the manner in which a manager performs a specific job task like reprimanding an employee.

2. Models of working environments and working relationships can be measured: The models held by job seekers and employers can be measured behaviorally. Different behavioral responses reflect different personality attributes and characteristics. The combination of different personality attributes and characteristics forms the basis of one type of profile. However, the present invention is not limited to such profiles and other profiles can also be used.

3. Greater overlap, "matching," between the candidate's and the employer's profiles yield superior job performance and job satisfaction: When there is more overlap between a candidate's and employer's profile, there is a better working relationship, and the candidate is more effective and efficient in their job performance. Simply put, people are happier to work with and for each other when they have similarities in the way they view the working environment, how they interact within their working environment, how they expect the working environment to be, and so on. This predicates most of the currently advertised matching agencies and organizations. No matter what kind of matching exercise, be it finding the right candidate for the job (1), or finding the 'person of your dreams and ever-lasting love', everyone assumes that the more similar two people are, the better the match, and the better the chances that the match will "last." Couples, regardless of their constituents, must share important, underlying values, or they will not stand the test of time.

At Step 32, the amount of overlap is used to create a priority list of the most desirable candidates in rank order for the selected job opening. The priority list is a tool hat can help provide vital information regarding the particular suitability of the employer and/or job seeker/employee. The underlying assumption is that a better match makes for a more satisfying working relationship, which has direct implications for satisfaction at work, performance at work, good retention and so on. Greater candidate-employer overlap yields superior job performance and higher levels of job satisfaction for the job seeker and longer retention of employees for the employer.

Figure 3:
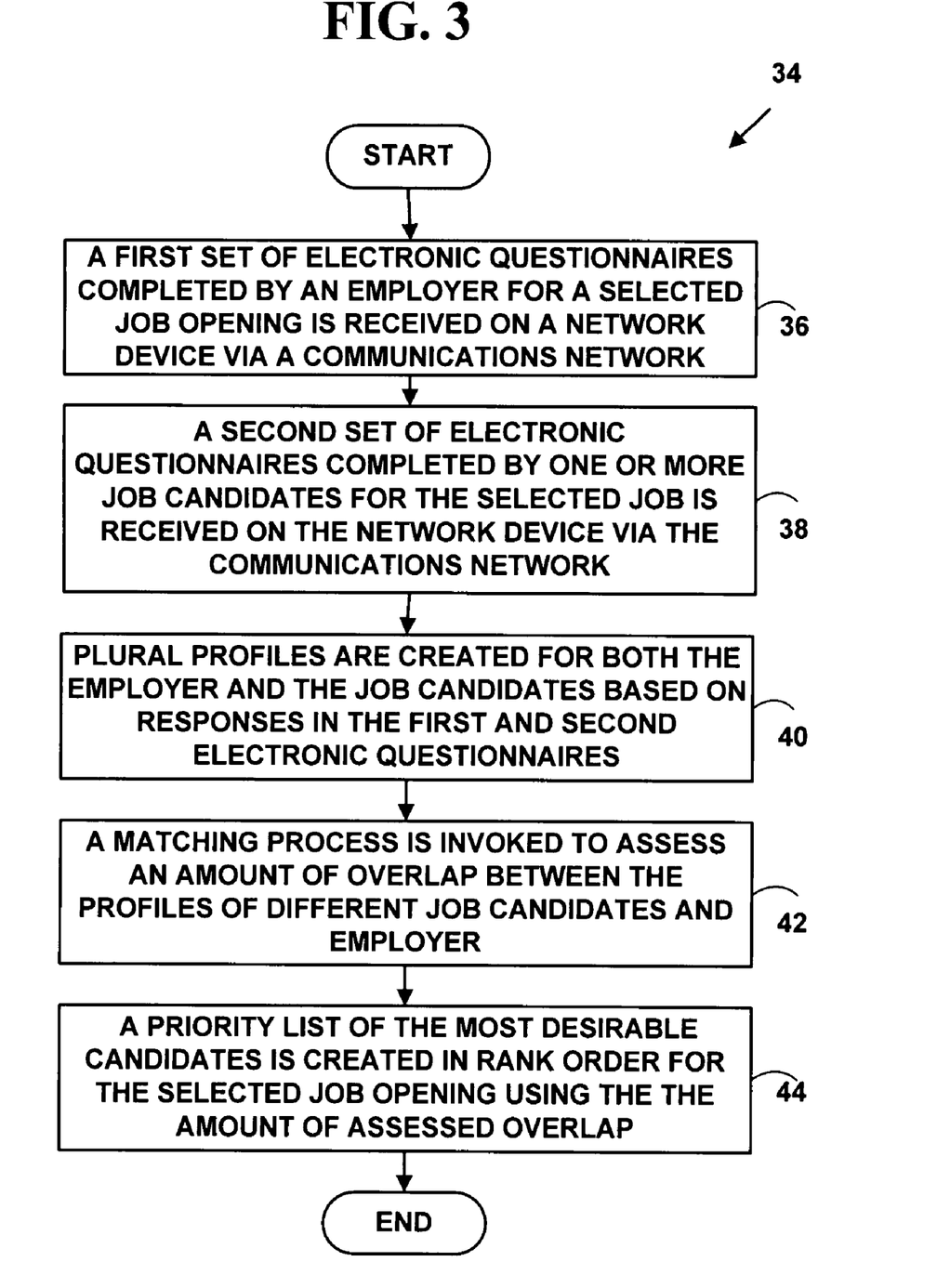
FIG. 3 is a flow diagram illustrating a method for career matching assessment.

FIG. 3 is a flow diagram illustrating a Method 34 for career matching assessment. At Step 36, a first set of electronic questionnaires designed to measure personal attributes and characteristics that are related to job performance and job satisfaction completed by an employer for a selected job opening are received on a network device via a communications network. The first set of electronic questionnaires includes questions related to internal and external dimensions of the employer. At Step 38, a second set of electronic questionnaires designed to measure personal attributes and characteristics that are related to job performance and job satisfaction are completed by one or more job seekers for the selected job are received on the network device via the communications network. The second set of electronic questionnaires includes questions related to internal and external dimensions of the job seeker. At Step 40, a profile is created for the employer and the job seekers based on responses in the first and second electronic questionnaires. The profile is created on the basis of answers to questions that assess external and internal dimensions of the employer and the job seekers. At Step 42, a matching process assesses an amount of overlap between the profiles of different job seekers and the employer. At Step 44, the amount of overlap is used to create a priority list of the most desirable job seeking candidates in rank order for the selected job opening.

Methods 24 and 34 have certain areas of strength in terms of its ability to provide a profile. However, the present invention is not limited to these strengths and more, fewer or other strengths can also be used.

1. The method and system is based on scientific evidence: The specific content of is based on sound scientific evidence and the most recent empirical findings. The method uses dimensions and items that are agreed to be important indicators of personality and characteristics.

2. The method and system does not rely exclusively on self assessment: Self assessment is one of the easiest ways of finding out what a person thinks, or feels. You ask the person, outright, "How important are holidays with your family?", and the person answers you by giving a rating, say from one to ten. It is a well-used and respectable method of finding out about a person. However, self assessment is replete with problems. First, in order to be an accurate assessment, the person must be self-aware and be able to reflect accurately. Self reflection is not always an easy thing to do. Second, there is the problem of self deception: you might think that you are a tolerant person; but few would agree with you. Finally, answers are also easily fabricated: people can produce "false" answers which they may believe are more desirable.

In method and system, job seeker candidate/employers do not exclusively make self-assessments. They answer many items in terms of how they ideally would like the other to answer. For example, a candidate is asked to answer a question, as if s/he were the employer. This approach has the distinct advantage of assessing personal attributes and characteristics in ways that do not focus as obviously on self reflection.

3. The method and system uses direct and indirect items: Many selection tests rely exclusively on the candidate/employer answering direct queries regarding various characteristics. For example, a direct question asks "what things are the most important to you?" and then provides you with a series of options from which you would select. The relationship between the test item and the characteristic(s) it is measuring is clear.

With indirect items, it is not as clear what the item is testing and so second-guessing is much more difficult. For example, you might be asked to provide a title to an ambiguous photograph, showing two people sitting at a table. It is not obvious what the item is measuring. Indirect items are very useful when assessing characteristics that are difficult to verbalize.

The methods and system comprises both direct and indirect items, and this gives it a distinct advantage. Different types of items provide converging evidence regarding underlying characteristics. Because of these converging sources of evidence, the method and system is a more powerful and sensitive profile of tacit traits and characteristics.

Field Testing

Validity and Reliability: In order to be scientifically credible, method and system are demonstrated to be valid and reliable. Validity means that the method must actually be measuring what it claims to be measuring. For example, if the method and system claims to measure self-esteem, then another, independent test, already demonstrated to measure self-esteem should be correlated with performance on the method and system. Reliability refers to how consistent and stable the answers are to the questions. For example, if the method and system purports to yield a profile, then the profile should be stable across time. Both validity and reliability were demonstrated through straightforward statistical analyses. The requisite analyses required only relatively small sample sizes (e.g., 100 candidates/employers).

Performance Outcomes related to method and system. Greater overlap between candidate-employer method and system profiles are shown to lead to better job performance and job satisfaction and longer retention. This was demonstrated with longitudinal analyses that identify the items in the method and system that are most predictive of job performance, job satisfaction and retention. Other evidence was amassed through retrospective paradigms, where currently matched employee-employer pairs are asked to fill on the questionnaires in the method and system, and profiles are compared.

The method and system described herein has several advantages. However, the present invention is not limited to these advantages and more fewer or other advantages may be present.

First, emphasis on matching capability and technology means that employers will only be interviewing preprogrammed numbers of prescreened candidates with a high probability of a successful hire. The method and system is referring only the best candidates, not all or large numbers candidates, for any job opening. Best of all, employers will therefore be hiring only high performance employees that are likely to be long term. The technology includes a point where the probability of a match is a tunable sensitivity, which will enable a controllable setting that will limit the number of likely matches referred. For instance, this sensitivity could be set to the top five candidates, or the top three. The method and system is able to verify candidate credentials either before or after the candidate referral at the discretion of the employer.

Second, Internet matching and communication capabilities between job seekers and prospective employers will amount to a significant leap in capability over existing career sites. The Internet technology described herein largely removes the administrative burden from the communication process between employers and qualified job seekers.

Third, the ability to automate job searching, recruiting, meeting scheduling, records updating, and data archiving processes will not only drive down employer costs, they will greatly contribute to employer client persistency and retention. Time is a very important component of cost, and the method and system has designed its Internet services to streamline job searching and recruiting processes for both itself and its clients, to shorten the time required to produce a successful hire, and to automate the communications and records keeping functions.

Fourth, the method and system are portable into both horizontal and vertical markets. It is equally efficient in both underserved and conventional recruiting markets. The method and system is very effective and competitive across all salary ranges. Consequently, it is fully scalable into both large and small industries.

The method and system may also provide that advantages listed in Table 1. However, the present invention is not limited to these advantages and more fewer or other advantages may be present.

TABLE 1

1. Provide products and services with equal capability, access and pricing to both conventional markets and underserved communities,
2. Emphasize matching so that employers will only interview and hire high performing long term employees,
3. Place equal emphasis on direct human involvement and the Internet for marketing and customer service,
4. Use the Internet to automate, track and record the entire hiring process to the greatest possible efficiency including providing automatic notifications of best candidates for a selected job opening.

It should be understood that the programs, processes, methods and system described herein are not related or limited to any particular type of computer or network system (hardware or software), unless indicated otherwise. Various combinations of general purpose, specialized or equivalent computer components including hardware, software, and firmware and combinations thereof may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more fewer or equivalent elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

We claim:
1. A Method for career matching assessment, comprising:
creating an electronic questionnaire for a selected job opening on a server network device with one or more processors, the electronic questionnaire including: (1) a plurality of non-self assessment questions for a plurality of job seekers that are answered by the plurality jobs seekers as if the plurality of job seekers are actually an employer offering the selected job opening instead of the plurality of job seekers seeking the selected job opening, (2) a plurality of general questions that focus on different aspects of a working environment and working relationships and do not access any underlying personality traits of the plurality of job seekers and (3) a plurality of indirect questions including photographs for the selected job opening for assessing characteristics of the plurality of job seekers that are difficult to verbalize;
making the electronic questionnaire available to a plurality of job seeker network devices with one or more processors via communications network from the server network device;
receiving a plurality of completed electronic questionnaires on the server network via the communications network for the selected job opening, wherein the plurality of completed electronic questionnaires measure attributes of models of working environments, problem solving, communication and inter-personal skills related to job performance and job satisfaction for the selected job opening and wherein the plurality of completed elec- tronic questionnaires included electronic questionnaires completed by the employer and the plurality of job seekers;

creating an electronic profile for the employer and a plurality of electronic profiles for the of plurality of job seekers based on responses in the plurality of completed electronic questionnaires;

invoking a matching process to assess an amount of overlap between the plurality of electronic profiles of the plurality of job seekers and the employer;

creating an electronic priority list from the assessed amount of overlap to list job seeker candidates in rank order for the selected job opening most desirable to the employer, wherein the priority list includes a prediction of job performance, job satisfaction and long term job retention for the job seeker candidates for the selected job opening for the employer; and presenting automatic notification of the electronic priority list on the server network device for the employer so a most desirable job seeker candidates for the selected job opening can be determined.

2. The method of claim 1 further comprising a computer readable medium have stored therein instructions for causing one or more processors to execute the steps of the method.

3. The method of claim 1 wherein the plurality of electronic questionnaires includes a plurality of Hyper Text Markup Language (HTML) forms, Extensible Markup Language (XML) forms or Java forms.

4. The method of claim 1 wherein the plurality of electronic questionnaires include an employer questioner including questions relating to an employer's beliefs, attitudes and thoughts about the working environment and working relationships.

5. The method of claim 1 wherein the plurality of electronic questionnaires include an employer questioner including questions relating to employer's beliefs, attitudes and thoughts about the working environment and working relationships with a focus on the employer's views on the work/life balance, their ideas about working relationships and how they would go about solving dilemmas and problems at work.

6. The method of claim 1 wherein the plurality of electronic questioners include a plurality of internal and external dimension factors.

7. The method of claim 6 wherein the internal dimension factors include mental and perceptual biases, emotional expression, verbal and social expression, personal values and moral codes, physicality including levels of physical energy and ways of expression, personal resiliency and social skills.

8. The method of claim 6 wherein the external dimension factors include salary, location, type of practice, type of professional encounters and employment benefits.

9. The method of claim 4 wherein the employer questionnaire includes a plurality of separate employer questionnaires each with a different focus each with a different focus relating to an employer.

10. The method of claim 1 wherein the plurality of electronic questionnaires include a job seeker questionnaire including questions related to beliefs, attitudes and thoughts about the working environment and working relationships for a job seeker.

11. The method of claim 10 wherein the job seeker questioner includes a plurality of internal and external dimension factors.

12. The method of claim 10 wherein the job seeker questionnaire includes questions relating to the job seeker's views on the work/life balance, their ideas about working relationships and how they would go about solving dilemmas and problems at work.

13. The method of claim 10 wherein the job seeker questionnaire includes a plurality of separate questionnaires each with a different focus relating to characteristics associated with the job seeker.

14. The method of claim 1 wherein the questions on the electronic questionnaires do not assess any underlying personality traits of the employer.

15. The method of claim 1 wherein the step of creating the electronic profile includes establishing how compatible two electronic questionnaires are, with respect to their views on the working environment, working relationships, and problem solving.

16. The method of claim 1 wherein the step of invoking a matching process includes matching a plurality of selected electronic questionnaires based on a plurality of model assumptions including: (1) measuring attributes of models of problem solving, communication and interpersonal skills; (2) measuring attributes of models of working environments and working relationships; and (3) measuring overlap matching between the created job seekers' and the employer's electronic profiles to yield predicted superior job performance and job satisfaction for the selected job opening.

17. The method of claim 1 wherein the step of creating a priority list includes providing creating the priority list with information regarding a suitability of the employer for a selected job seeker and a suitability for the selected job seeker for the employer based on responses from the electronic questionnaires.

18. The method of claim 1 further comprising:

receiving a first set of electronic questionnaires designed to measure attributes of models of working environments, problem solving, communication and inter-personal skills related to job performance and job satisfaction completed by the employer for the selected job opening on the server network device via the communications network from the employer, wherein the first set of electronic questionnaires include questions related to internal and external dimension factors of the employer;

receiving a second set of electronic questionnaires designed to measure attributes of models of working environments, problem solving, communication and inter-personal skills related to job performance and job satisfaction completed by the employer for the selected job opening on the server network device via the communications network from the plurality of job seekers, wherein the second set of electronic questionnaires include questions related to internal and external dimension factors of the plurality of job seekers;

creating a profile for the employer and the plurality of job seekers based on responses in the first and second electronic questionnaires, wherein the profile is created on the basis of answers to questions that assess external and internal dimension factors of the employer and the plurality of job seekers;

invoking the matching process to assesses an amount of overlap between the profiles of the plurality of job seekers and the employer; and creating an electronic priority list of job seekers in rank order for the selected job opening from the accessed amount of overlap most desirable to the employer; and presenting the electronic priority list on the server network device for the employer so the employer make select a desirable job seeker for the selected job opening.

19. The method of claim 18 further comprising a computer readable medium have stored therein instructions for causing one or more processors to execute the steps of the method.

20. The method of claim 18 wherein the internal dimension factors of the employer and the plurality of job seekers include mental and perceptual biases, emotional expression, verbal and social expression, personal values and moral codes, physicality including levels of physical energy and ways of expression, personal resiliency and social skills.

21. The method of claim 18 wherein the external dimension factors of the employer and the plurality of job seekers include salary, location, type of practice, type of professional encounters and employment benefits.

22. A career matching assessment system, comprising in combination:

means for creating an electronic questionnaire for a selected job opening on a server network device with one or more processors, the electronic questionnaire including: (1) a plurality of non-self assessment questions for a plurality of job seekers that are answered by the plurality jobs seekers as if the plurality of job seekers are actually an employer offering the selected job opening instead of the plurality of job seekers seeking the selected job opening, (2) a plurality of general questions that focus on different aspects of a working environment and working relationships and do not access any underlying personality traits of the plurality of job seekers and (3) a plurality of indirect questions including photographs for the selected job opening for assessing characteristics of the plurality of job seekers that are difficult to verbalize;

means for making the electronic questionnaire available to a plurality of job seeker network devices with one or more processors via the communications network from the server network device;

means for providing a plurality of electronic questionnaires for the employer and the plurality of job seekers on the server network device via the communications network wherein the plurality of electronic questionnaires include external and internal dimension factors of the employer and the plurality of job seekers for a selected job opening;

means for creating an electronic profile for the employer and the plurality job seekers based on responses from a plurality of electronic questionnaires, wherein the electronic profiles are created on the basis of answers to questions that assess external and internal dimension factors of the employer and the plurality of job seekers for the selected job opening;

means for assesses an amount of overlap between the created profiles of the plurality of job seekers and the employer; and means for creating an electronic priority list in rank order for the selected job opening from the accessed amount of overlap most desirable to the employer;

means for presenting automatic notification of the electronic priority list on the server network device for the employer so a most desirable job seeker candidates for the selected job opening can be determined.

* * * * *